April 6, 1937.  H. B. MILLER  2,075,822
ALARM SYSTEM
Filed June 22, 1931  9 Sheets-Sheet 1

Inventor:
Harold B. Miller.
By Reif & Braddock
Attorneys.

April 6, 1937.  H. B. MILLER  2,075,822
ALARM SYSTEM
Filed June 22, 1931  9 Sheets-Sheet 2

Inventor
Harold B. Miller.
By Reif & Braddock
Attorneys.

April 6, 1937.  H. B. MILLER  2,075,822
ALARM SYSTEM
Filed June 22, 1931  9 Sheets-Sheet 3

Fig-6

Inventor:
Harold B. Miller.
By Reif & Braddock
Attorneys.

April 6, 1937. H. B. MILLER 2,075,822
ALARM SYSTEM
Filed June 22, 1931 9 Sheets-Sheet 8

Inventor:
Harold B. Miller.
By Reif & Braddock
Attorneys.

April 6, 1937.     H. B. MILLER     2,075,822
ALARM SYSTEM
Filed June 22, 1931     9 Sheets-Sheet 9

Inventor
Harold B. Miller
By Reif & Braddock
Attorneys

Patented Apr. 6, 1937

2,075,822

UNITED STATES PATENT OFFICE 2,075,822

ALARM SYSTEM

Harold B. Miller, Minneapolis, Minn.

Application June 22, 1931, Serial No. 545,881

7 Claims. (Cl. 177—311)

This invention relates to an alarm system adapted to be employed either as a single alarm system consisting of one alarm producing unit, or as a multiple alarm system consisting of a plurality of alarm producing units.

An object of the invention is to provide an alarm system wherein each alarm of the system will be caused to function or operate either when a line wire of the system becomes broken, or when a line wire of said system becomes grounded.

A further object is to provide an alarm system which can include one or more alarm producing units each of novel and improved construction, and each adapted to be restored to normal position, after actuation thereof, in novel and improved manner.

And a still further object is to provide an alarm system consisting of individual alarm producing units a plurality of which can be associated and combined with each other in novel and improved manner to provide a multiple alarm system of novel and improved construction.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification.

In Figs. 1, 2, 2a, 2b, 3, 4, 4a, and 5 of the drawings an alarm system consisting of a single unit for producing or designating an alarm from a single station is disclosed, said unit including relays which may, for convenience, be termed relays A, B and C, respectively.

Figures 1, 3:
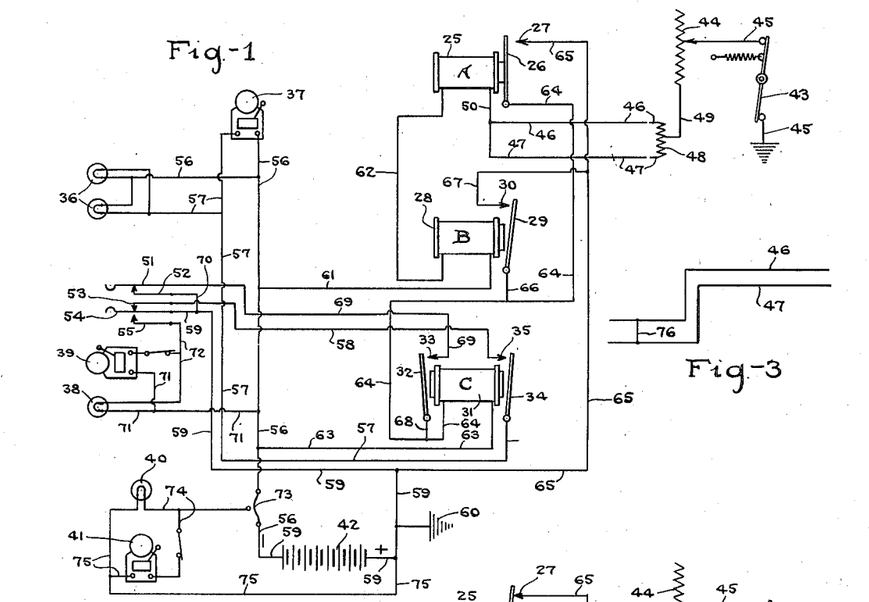
Fig. 1 is a diagrammatic view of an alarm system made according to the present invention and including a single alarm producing unit, all of the elements of said single alarm producing unit being shown in normal positions, ready to be operated to make an alarm discernible.
Fig. 3 is a view showing line wires as in Figs. 2a and 2b interconnected, to have no resultant effect upon a unit as in Fig. 1.

The relay A consists of a magnet 25 having a pivoted armature 26 which constitutes a movable switch arm of a switch including a fixed contact 27. The relay B consists of a magnet 28 having a pivoted armature 29 which constitutes a movable switch arm of a switch including a fixed contact 30. The relay C consists of a magnet 31 having a pivoted armature 32 at one of its ends which constitutes a movable switch arm of a switch including a fixed contact 33, and having at its other end a pivoted armature 34 which constitutes a movable switch arm of a switch including a fixed contact 35.

The unit, as disclosed, also includes alarm signal lamps 36, an alarm signal gong 37, a trouble and restorer lamp 38, a trouble and restorer gong 39, a fuse alarm lamp 40, and a fuse alarm gong 41.

A suitable battery for the alarm producing or designating mechanism of the unit is indicated 42, and an alarm actuating switch, in spaced relation to the alarm producing or designating mechanism, is represented 43.

At the location of the alarm actuating switch, which switch is situated at a place to be protected, a variable resistance 44 is inserted in the circuit and positioned in a suitable locked box. One side of this resistance 44 is connected as at 45 to ground in series with the switch 43. The other side of the variable resistance 44 is desirably connected to lead wires 46 and 47 from the alarm designating mechanism of the unit, said wires 46 and 47 being connected with each other preferably by a fixed resistance 48 of predetermined value which fixed resistance is desirably positioned in the locked box with the variable resistance 44 and is connected at its mid point by a lead wire 49 to said variable resistance 44. When the switch 43 is located at some considerable distance from the alarm designating mechanism, the fixed resistance 48 may be omitted. The lead wires 46 and 47 join a lead wire 50 attached to the magnet 25. In certain instances, said lead wires 46 and 47 may be a single lead wire.

The alarm designating mechanism incorporates a plurality of switches which include a movable contact 51, a fixed contact 52, a fixed contact 53, a movable contact 54 and a fixed contact 55.

Following is a description of the remainder of the wiring of the unit: A lead wire 56 extends from the minus side of the battery to the lamps 36 and the gong 37, and a lead wire 57 extends from said lamps 36 and said gong 37 to the switch arm 34. A lead wire 58 extends from the fixed contact 35 to the fixed contact 53, and a lead wire 59 extends from the movable contact 54 to the plus side of the battery. Said lead wire 59 is grounded at 60.

A lead wire 61 attached to the lead wire 56 extends to the magnet 28, and a lead wire 62 connects the magnet 28 with the magnet 25. A lead wire 63 extends from the lead wire 56 to the magnet 31, a lead wire 64 extends from said magnet 31 to the switch arm 26, and a lead wire 65 extends from the fixed contact 27 to the lead wire 59. A lead wire 66 extends from the lead wire 64 to the switch arm 29, and a lead wire 67 extends from the fixed contact 30 to the lead wire 65.

A lead wire 68 extends from the lead wire 64 to the switch arm 32, a lead wire 69 extends from the fixed contact 33 to the movable contact 51, and a lead wire 70 extends from the fixed contact 52 to the lead wire 59.

A lead wire 71 extends from the lead wire 56 to the lamp 38 and the gong 39, and a lead wire 72 extends from said lamp 38 and gong 39 to the fixed contact 55. The lead wire 56 includes a fuse 73, a lead wire 74 extends from location adjacent said fuse to the lamp 40 and the gong 41, and a lead wire 75 extends from said lamp 40 and gong 41 to the lead wire 59.

As shown in Fig. 1 all of the parts of the alarm producing unit are in normal position, the various alarms of the unit being set to be operated upon the breaking of either or both of the line wires 46, 47 of the unit or upon the grounding of either or both of said line wires or of a single line wire substituted therefor. It will be understood that the alarm designating mechanism will, in practice, be safely incorporated in a housing or container therefor at the location where the alarm is to be discernible, and the alarm actuating mechanism will also be suitably housed at the location from which the alarm is to be sent. Naturally, the line wire or line wires between the alarm actuating mechanism and the alarm receiving or designating mechanism must be accessible.

The magnet 25 of the relay A is, as shown in Figure 1, normally included in a circuit leading from the battery 42 through the lead wire 56, the lead wire 61, the magnet 28, the lead wire 62, said magnet 25, the lead wire 50, the lead wires 46 and 47 or a single lead wire substituted therefor, the fixed resistance 48, the lead wire 49, the variable resistance 44, the lead wire 45, and the switch 43 to ground.

Figures 4, 4A:
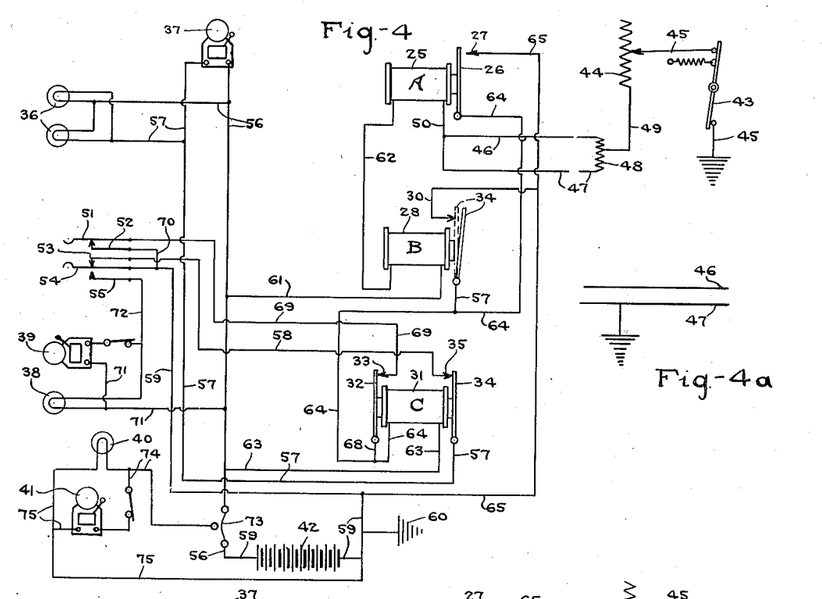
Fig. 4 is a view similar to Figs. 1 and 2, but showing the parts of the unit positioned as when one or more line wires are grounded, or as when the actuating switch has been restored to closed position.
Fig. 4a is a view disclosing a grounded line wire for producing the result as in Fig. 4.

When the unit is installed, the variable resistance 44 is adjusted until a predetermined current flow is recorded on a test meter. This current flow is sufficient to energize the magnet 25 to cause it to attract its armature 26 to thus hold the members 26 and 27 apart, but is insufficient to energize the magnet 28 to cause this magnet to attract its armature 29. Thus, the members 29 and 30 will normally remain apart, as will also the members 32 and 33, and the members 34 and 35. That is to say, the relay B is so adjusted or constructed that it will not operate on the current flow that is required to operate the relay A. Thus, the relay B remains in normal position as shown in Fig. 1 at all times except when either or both of the line wires 46 and 47 or a single line wire substituted therefor become grounded to cause the line to have less resistance than that in the normal circuit through the magnets 28 and 25. Grounding of a line wire 46 or 47, or both, causes the magnet 28 to be energized sufficiently to attract its armature 29 and close the circuit at 30. When the members 29 and 30 come into engagement, the magnet 31 is energized, the circuit through said magnet 31 being traced from the battery 42, through the lead wire 56 and the lead wire 63 to said magnet 31, thence through the lead wire 64 to the lead wire 66, thence through said lead wire 66 and the members 29 and 30 to the lead wire 67, and thence through said lead wire 67, the lead wire 65 and the lead wire 59 back to the battery. In Fig. 4a the line wire 47 is shown grounded, and in Fig. 4 the armature of the relay B is shown, in dotted lines, attracted by the magnet 28 to make the circuit through the relay C, the magnet 31 of which has also attracted its armatures.

Figures 2, 2A, 2B:
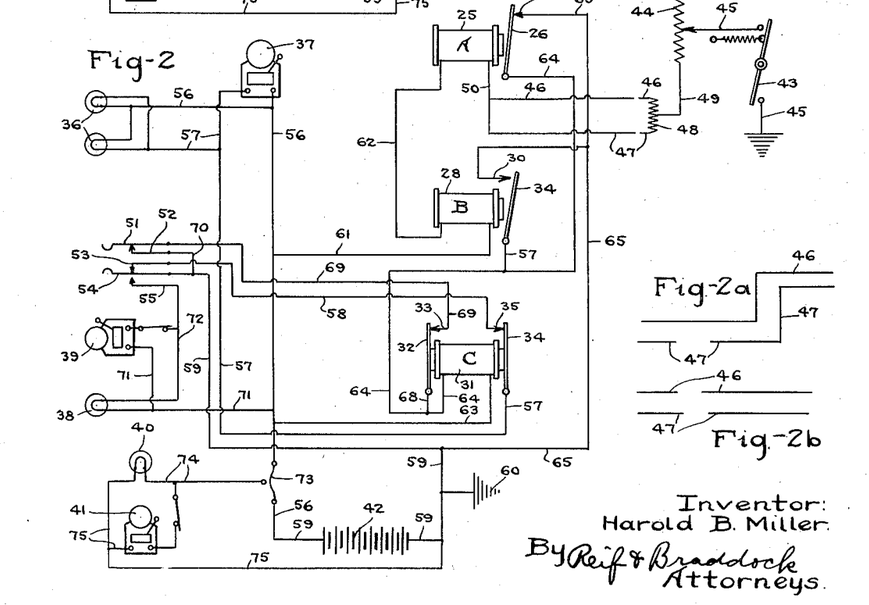
Fig. 2 is a similar view showing a switch of the unit as having been moved to open position to cause the alarms of the unit to operate.
Figs. 2a and 2b are views disclosing connecting line wires of the unit broken, with the same result as in Fig. 2.

Upon the breaking of the circuit through the relay A, as by manipulation of the switch 43 to open position shown in Fig. 2, or by breaking of both of the lead wires 46 and 47 shown in Fig. 2b or a single lead wire substituted therefor, the armature 26 is released from the magnet 25 and is caused to engage the fixed contact 27, it being understood that a spring (not shown) is attached to each of the armatures 26, 29, 32 and 34 to resiliently urge said armatures away from their magnets. Upon the breaking of either of the lead wires 46 or 47, as shown in Fig. 2a, the normal current flow through the magnet 25, as well as through the magnet 28, is reduced by half on account of the increased resistance due to the fact that only one lead wire, 46 or 47 as the case may be, remains to carry the current through said magnet 25. Such condition, by virtue of the initial adjustment of the magnet 25 of the relay A to suit the electric currents employed in the system, causes the armature 26 to be released from said magnet 25 and to engage the fixed contact 27 in the same manner as when the circuit through the magnet 25 is completely broken. Engagement of the members 26 and 27 with each other completes a circuit through the magnet 31, said circuit being traced from the battery 42 through the lead wire 56 and the lead wire 63 to said magnet 31, thence through the lead wire 64 and the members 26 and 27 to the lead wire 65, and thence through the lead wire 65 and the lead wire 59 back to the battery.

Energization of the magnet 31, either by engagement of the members 26 and 27 or the members 29 and 30 with each other, causes the armatures 32 and 34 to be attracted. The armature 32 when attracted engages the fixed contact 33, and the armature 34 when attracted engages the fixed contact 35.

When the members 34 and 35 are in engagement, a circuit is completed through the alarm signal lamps 36 and the alarm signal gong 37, said circuit being traced from the battery 42 through the lead wire 56 to said signal lamps and said signal gong, thence through the lead wire 57 and said members 34 and 35 to the lead wire 58, and thence through the lead wire 59, the fixed contact 53, the movable contact 54, and the lead wire 59 back to the battery. Thus, whenever the magnet 31 is energized, the signals 36 and 37 are made discernible. It will be obvious that the magnet 31 will be energized either when a line wire of the system becomes broken, or when a line wire of said system becomes grounded.

The magnet 31 will, naturally, when once energized, remain energized as long as the movable contact 51 and the fixed contact 52 remain in engagement, a holding circuit for said magnet 31 being traced from the battery 42 through the lead wires 56 and 63 to said magnet 31, thence through the lead wires 64 and 68 to the member 32, thence through the members 32 and 33 and the lead wire 69 to said members 51 and 52, and thence through the lead wires 70 and 59 back to the battery.

Figure 5:
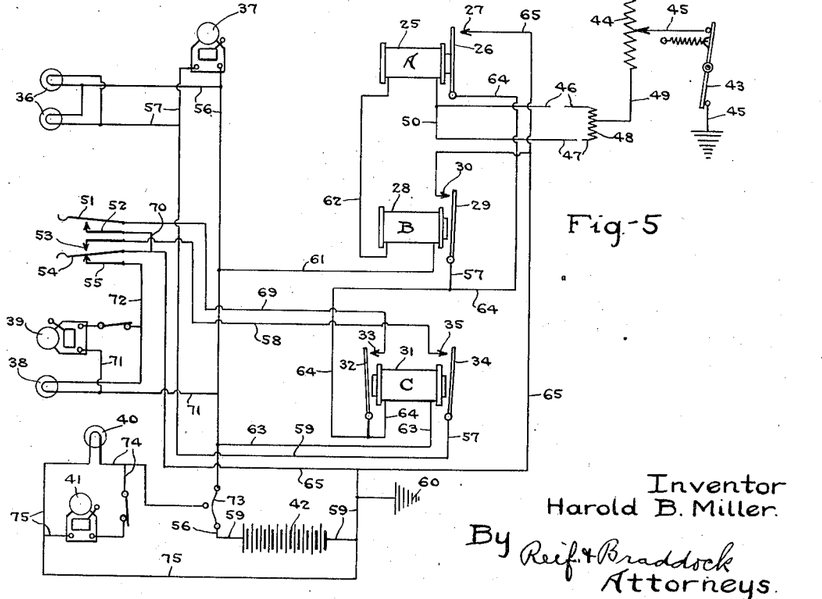
Fig. 5 is a view similar to Fig. 1, but showing the unit as when being reset to normal position.

The contacts 51, 52, 53, 54 and 55 together constitute a unit adapted to be manipulated from the position as disclosed in Figs. 1, 2 and 4 to the position as disclosed in Fig. 5 to cause the contacts 51 and 52 to be disengaged, the contacts 53 and 54 to be disengaged, and the contacts 54 and 55 to be engaged.

Upon the separation of the contacts 51 and 52, the holding circuit through the magnet 31 is broken. If at this time the normal circuits through the relays A and B are restored to cause the members 26, 27 and 29, 30 to be separated, the circuit through said magnet 31 will be broken, and the armatures 32 and 34 will move from their positions as in Fig. 4 to their positions as in Fig. 5. Upon the separating of the contacts 53 and 54, the circuit through the signals 36 and 37 becomes broken, as will be evident, said circuit including said contacts 53 and 54.

Upon the engagement of the contacts 54 and 55 with each other, a circuit will be completed through the trouble and restorer signals 38 and 39, said circuit being traced from the battery 42 through the lead wire 56 and the lead wire 71 to said trouble and restorer signals, thence through the lead wire 72 and said contacts 55 and 54 to the lead wire 58, and thence through the lead wire 59 back to the battery. Thus, the trouble and restorer signals 38 and 39 will be made discernible, and will remain discernible, as long as the contacts 54 and 55 are in engagement.

It will be apparent that upon restoration of the contacts 51, 52, 53, 54 and 55 as in Fig. 5 back to their normal positions as in Fig. 1, the trouble and restorer signals will be made non-discernible, and the alarm signals 36 and 37 will remain non-discernible, provided the relays A, B and C are normally positioned. Should there, however, at this time, be a line wire of the system either broken or grounded, said alarm signals will, obviously, become again discernible. In short, when there is a condition other than normal of the system, either the signals 36 and 37 or the signals 38 and 39 will remain discernible, depending upon the positions of the contacts 51 to 55, inclusive.

The construction of the fuse 73 is such that upon the breaking of this fuse a circuit is completed through the fuse alarm signals 40 and 41, said circuit being traced from the battery 42 through the lead wire 56, the fuse 73, and the lead wire 74 to said fuse alarm signals, and thence through the lead wire 75 and the lead wire 59 back to the battery. Hence, the fuse signals will be discernible until a broken fuse is replaced.

Attention is called to the fact that the phenomenon which can cause the present alarm to function or operate may be either a broken line wire connection, or a grounded connection to either or both sides of the line, or a broken connection due to the destruction of an element inserted in a line of the system and intended to be destroyed by melting or otherwise, or a broken connection made by actuation of a thermostatic element, or by an operated switch connection in the system; in fact, the present system will be operative to make a discernible signal whenever any condition occurs in the system to alter or break the circuit through the relay A, or increase the value of the circuit through the relay B.

In Fig. 3, line wires 46 and 47 are disclosed interconnected by a lead wire 76. Attention is called to the fact that such an interconnected lead wire will not in any manner affect the operation of the system, for the reason that the cross lead wire, such as 76, between line wires 46 and 47, will not in any manner affect the circuit through either of the relays A or B. As before stated, the line wires 46 and 47 may in certain instances be a single line wire.

In practice, the switch 43 will ordinarily return to closed position immediately after it is actuated to break the circuit through the relay A, so that when the unit including the contacts 51 to 55, inclusive, is actuated from the position as in Figs. 1, 2 and 4 to the position as in Fig. 5 and then back to the position as in Figs. 1, 2 and 4, the system will be set at normal, provided neither the line wire 46 nor the line wire 47 is broken or grounded. Should a line wire 46 or 47 be broken or grounded, the unit including the contacts 51 to 55, inclusive, will be manually returned to the position as in Fig. 5, and the trouble and restorer signals 38 and 39 will remain discernible until the system is placed in order, unless a switch in the line, say, in the wire 72, is actuated to open position.

It need not be remarked that the variable resistance 44, the fixed resistance 48, and the magnets 25 and 28 will be constructed or adjusted to bear relation to each other suitable to the operation of the particular unit in which these mentioned parts are incorporated. That is to say, in any installation, the values of all of the variable resistance 44, fixed resistance 48, and magnets 25 and 28 bear definite relation to each other.

In Figs. 6 to 22, inclusive, of the drawings, an alarm system consisting of a plurality of units for producing or designating an alarm from a plurality of different stations is disclosed, each of the units of the multiple alarm system including relays A, B and C, and also including all of the other elements as set forth in connection with Figs. 1, 2, 4 and 5.

Additionally, the multiple alarm system, incorporating units as already set forth, includes mechanisms which will be hereinafter described.

The multiple alarm system includes a panel board which receives all alarms at a central point. The different alarms can originate at any variable distances from said panel board, each alarm producing unit, as already described, being constructed and adjusted to suit the conditions.

When employing the alarm system of the invention as a multiple alarm system, a single line wire or pair of line wires must lead from each location to be protected to the panel board, as will be evident.

It is well known that in the distribution of telephone wiring, the various branches or exchanges located in different sections of a community are connected together by cables each containing a multiplicity of wires which terminate on racks in said branches or exchanges. Obviously, the wire distribution in a multiple alarm system incorporating the features of the present invention can follow the same principle as the telephone wiring system.

Referring to the disclosure of the invention as made in Figs. 6 to 22 of the drawings, the relay A of each of the different alarm producing units consists of a magnet 77 having a pivoted armature 78 which constitutes a movable switch arm of a switch including a fixed contact 79. The relay B of each of the units of the multiple alarm system consists of a magnet 80 having a pivoted armature 81 which constitutes a movable switch arm of a switch including a fixed contact 82. The relay C of each unit of the multiple alarm system consists of a magnet 83 having a pivoted armature 84 at one of its ends which constitutes a movable switch arm of a switch including a fixed contact 85, and having at its other end a compound pivoted armature including bars 86 and 87 which constitute movable switch arms of switches including fixed contacts designated 88 and 89, respectively.

Each unit of the multiple system, as disclosed also includes alarm signal lamps 90, and a trouble and restorer lamp 91.

A suitable battery, or batteries, for the alarm producing or designating mechanisms of all of the units, is indicated 92, and an alarm actuating switch, or switches, one or more for each unit, in spaced relation to the alarm producing or designating mechanism of the unit, is designated 93.

The battery or batteries employed will be any battery or batteries suitable to the purpose, and may desirably be kept charged by an automatic charging circuit (not shown).

At the location of each alarm actuating switch, a variable resistance 94 is inserted in the circuit and positioned in a suitable locked box in the manner as hereinbefore set forth. One side of each resistance 94 is connected as at 95 to ground in series with a corresponding switch 93. The other side of each variable resistance 94 is connected to lead wires 96 and 97 from the alarm designating mechanism of the corresponding unit, said wires 96 and 97 being connected with each other by a fixed resistance 98, or directly connected as the case may be, which fixed resistance when employed may be of about the construction of the fixed resistance 44 already set forth, may be positioned in the locked box with the corresponding variable resistance 94, and may be connected at its mid point by a lead wire 99 to said variable resistance 94. Where no fixed resistance is employed, the lead wire 99 is jointed to the lead wires 96 and 97 at location where these meet each other. See the left hand side of each of Figs. 6 and 7. As hereinbefore mentioned, the fixed resistance 98 may be omitted in a case where the switch 93 is located at some considerable distance from its corresponding alarm designating mechanism. The lead wires 96 and 97 of each unit join a lead wire 100 attached to the magnet 77 of said unit. Said lead wires 96 and 97 may in some instances be replaced by a single lead wire.

The alarm designating mechanism of each of the individual units of the multiple alarm system incorporates a plurality of switches which include a movable contact 101, a fixed contact 102, a fixed contact 103, a movable contact 104, a fixed contact 105, and a fixed contact 106.

A lead wire 107 extends from the battery 92 to a lower one of common minus bars 108 to which a plurality of fuses 109 are connected, and a lead wire 110 extends from a common plus bar 111 to said battery.

Lead wires designated 112 extend from individual fuses 109 to the lamps 90 of each unit, and a lead wire denoted 113 extends from said lamps 90 of each unit to the switch arm 86 of the unit. Lead wires 114 extend from each fixed contact 88 to each fixed contact 85, and lead wires 115 extend from each switch arm 84 to each fixed contact 103. A lead wire 116 extends from each movable contact 104 to the common plus bar 111. Said common plus bar is grounded at 117.

A lead wire 118 attached to each lead wire 112 extends to each magnet 80, and a lead wire 119 connects each magnet 80 with a magnet 77. A lead wire 120 extends from each lead wire 112 to each magnet 83, a lead wire 121 extends from each magnet 83 to each movable contact 101, and a lead wire 122 connects each fixed contact 102 with each lead wire 115. A lead wire 123 extends from each lead wire 115 to each switch arm 78, and a lead wire 124 extends from each fixed contact 79 to each lead wire 116. A lead wire 125 extends from each lead wire 123 to each switch arm 81, and a lead wire 126 extends from each fixed contact 82 to each lead wire 124.

Lead wires 127 extend from the lower common minus bar 108 to each of the lamps 91, and lead wires 128 extend from said lamps 91 to each fixed contact 106.

In the disclosure as made, the multiple alarm system includes a single set of fuse alarm lamps 129 and a single fuse alarm gong 130. A lead wire 131 extends from the upper common minus bar 108 to the fuse alarm lamps 129 and the fuse alarm gong 130, and a lead wire 132 extends from said fuse alarm lamps and gong to the common plus bar 111.

Figures 11, 12:
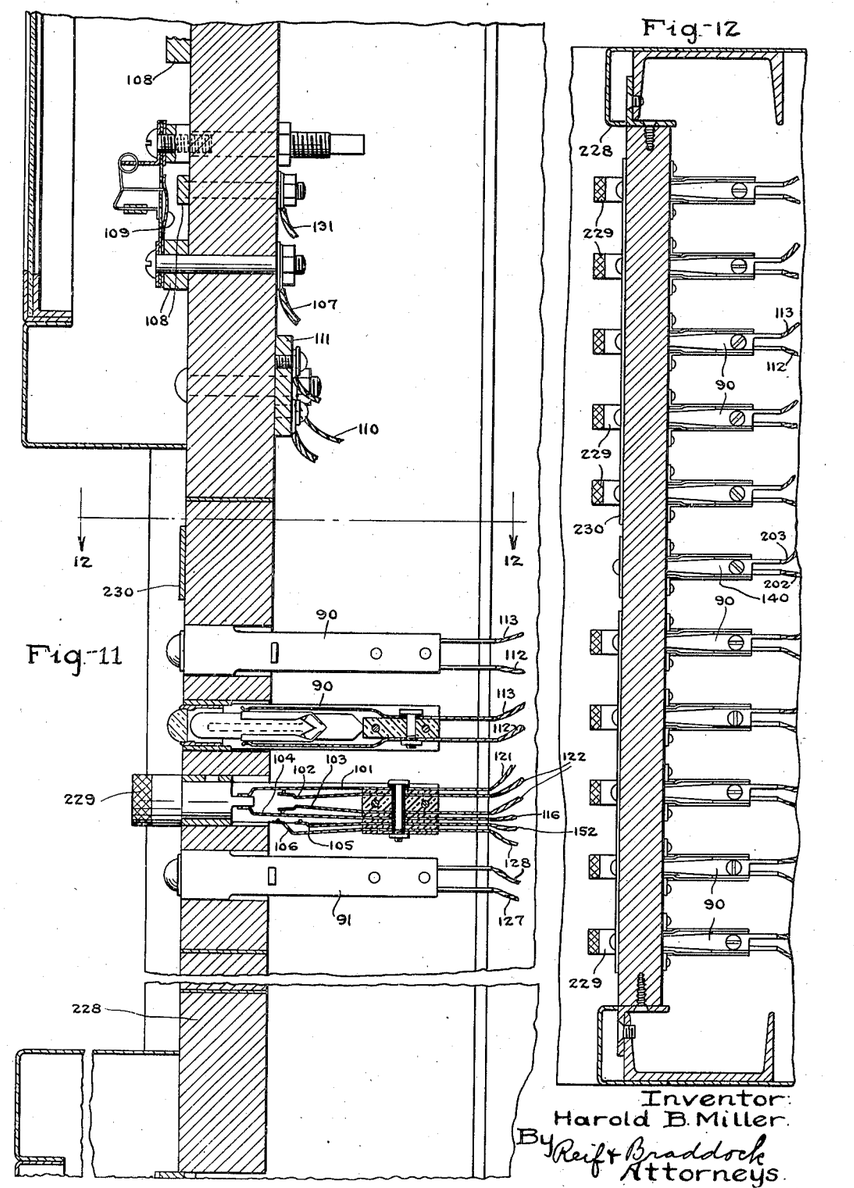
Fig. 11 is an enlarged fragmentary vertical sectional view of the forward wall or panel of said cabinet of Fig. 8.
Fig. 12 is a horizontal sectional view, on a reduced scale, taken as on line 12—12 in Fig. 11.

Each of the individual alarm system units of the multiple alarm system as so far described will function in about the manner as already set forth in connection with Figs. 1 to 5, except that in the multiple alarm system there is a single group of fuse alarm lamps 129 and a single fuse alarm gong 130 which will, evidently, be caused to operate when any one of the fuses 109 breaks. It might be here stated that each fuse 109 is of the telltale type, as best shown in Figs. 11, 13 and 18, to interconnect the upper and lower bars 108 of the fuse panel whenever a fuse breaks, the interconnection of said fuse panel bars by the breaking of a fuse being accomplished in a well known manner.

Figure 6:
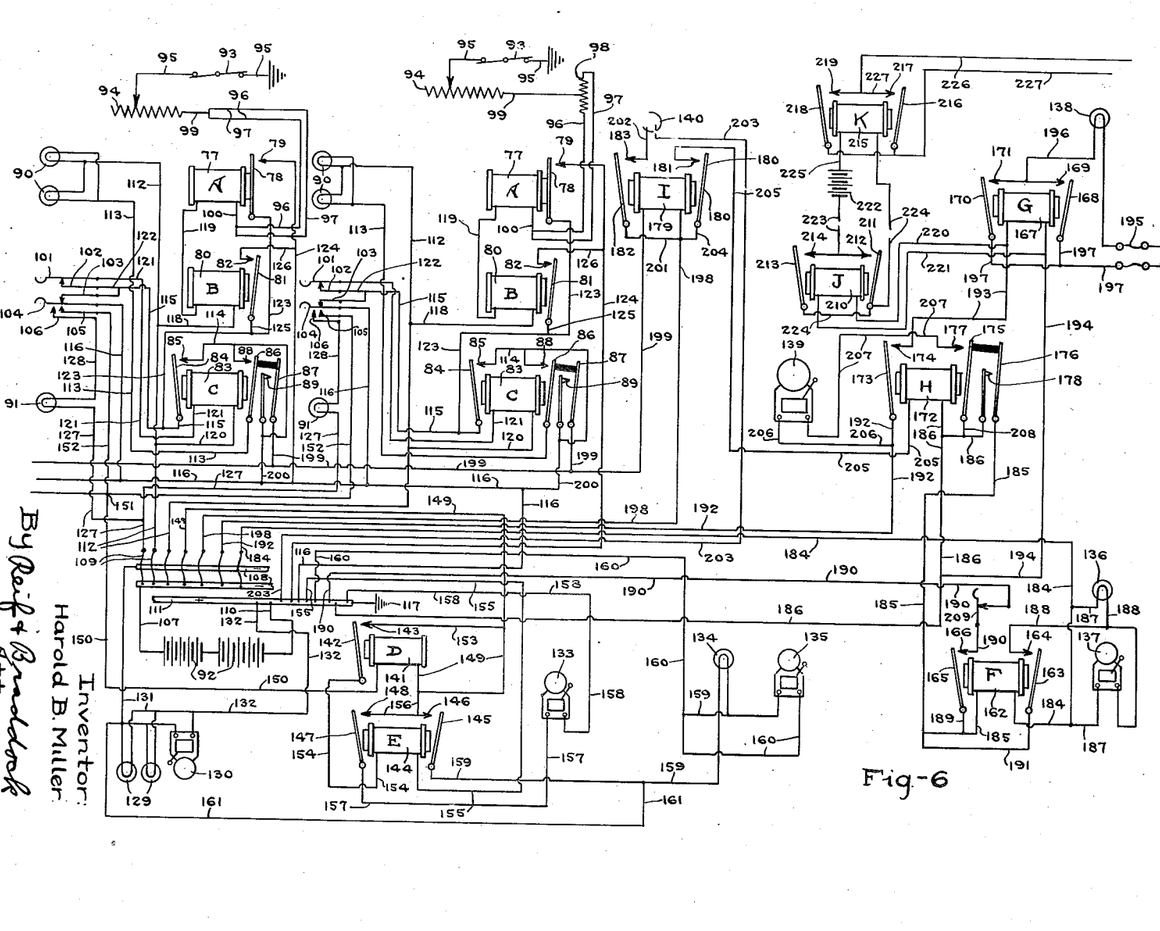
Fig. 6 is a diagrammatic view of an alarm system made according to the invention and including a plurality of alarm producing units all shown in normal positions, each ready to be operated to make an alarm discernible.
Figure 7:
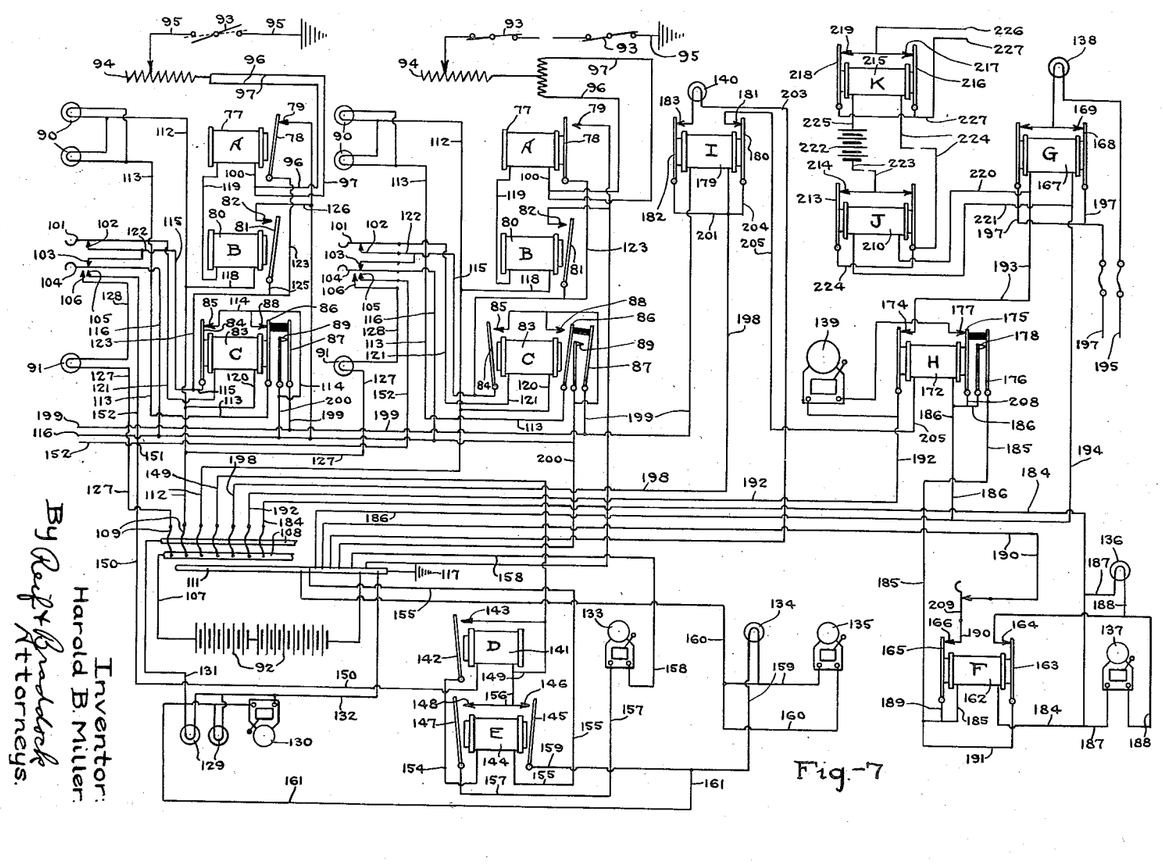
Fig. 7 is a view similar to Fig. 6, showing a switch of one of the units as having been moved to open position to cause the alarms of one of the units to operate.
Figures 13, 14, 15, 18:
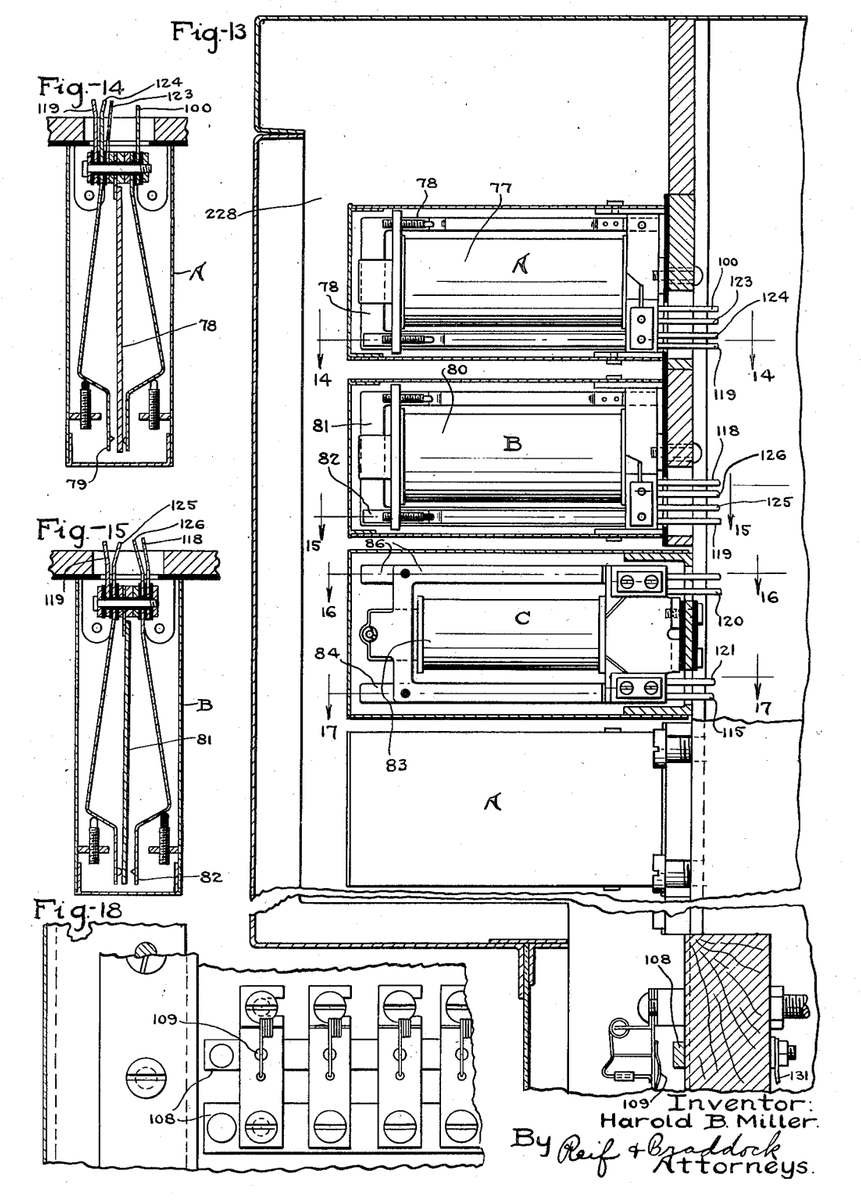
Fig. 13 is a detail sectional view disclosing the relays of any one of the alarm producing units of the invention, the present view also disclosing one of the fuses.
Fig. 14 is a sectional view of the upper relay of Fig. 13, taken on line 14—14 in said Fig. 13.
Fig. 15 is a sectional view of the middle relay of Fig. 13, taken on line 15—15 in said Fig. 13.
Fig. 18 is an elevational view of a fragment of the fuse panel.
Figure 19:
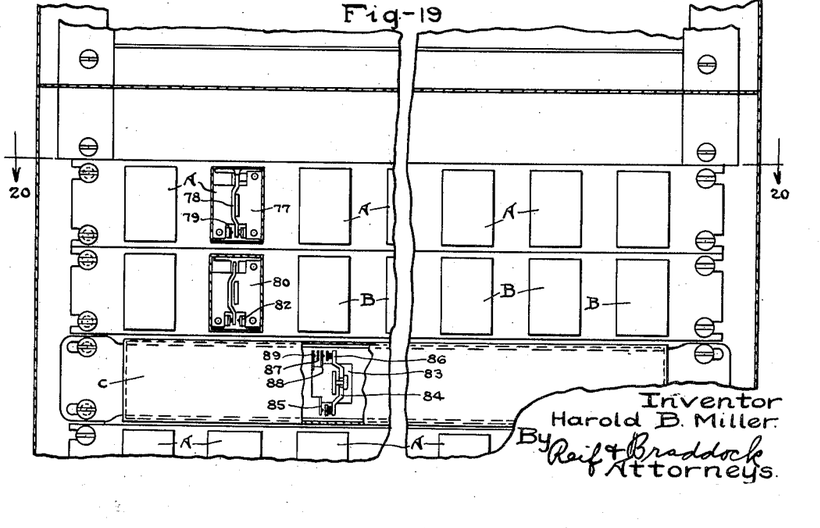
Fig. 19 is a detail sectional view of a portion of the cabinet of Fig. 8, showing certain of the relay housings in elevation, and others of said relay housings in section.

Each magnet 77 of the relay A of Figs. 6, 7 and 13 is normally included in a circuit leading from the battery 92 through the lead wire 107, the lower bar 108, the lead wire 112, the lead wire 118, the magnet 80, the lead wire 119, said magnet 77, the lead wire 100, the lead wires 96 and 97, the fixed resistance 98 when employed, the lead wire 99, the variable resistance 94, the lead wire 95, and the switch 93 to ground.

As hereinbefore set forth, when each unit is installed, the variable resistance 94 is adjusted until a predetermined current flow is recorded on a test meter. This current flow is sufficient to energize the magnet 77 of the unit to cause it to attract its armature 78 to thus hold the members 78 and 79 apart, but is insufficient to energize the magnet 80 to cause this magnet to attract its armature 81. Thus, the members 81 and 82 will normally remain apart, as will also the members 84 and 85, the members 86 and 88, and the members 87 and 89. That is to say, the relay B of each unit is so adjusted or constructed that it will not operate on the current flow that is required to operate the relay A. Thus, each relay B remains in normal position at all times except when either or both of the line wires 96 and 97 become grounded to cause the line to have less resistance than that in the normal circuit through the magnets 80 and 77 of a unit. Grounding of a line wire 96 or 97, or both, of a unit causes the magnet 80 thereof to be energized to attract its armature 81 and close the circuit at 82. When the members 81 and 82 of a unit come into engagement, the magnet 83 of that unit is energized, the circuit through said magnet 83 being traced from the battery 92, through the lead wire 107, the lower bar 108, the corresponding lead wire 112, and the corresponding lead wire 120 to said magnet 83, thence through the corresponding lead wire 121 to the corresponding movable contact 101, thence through the corresponding fixed contact 102, the lead wire 122, the lead wire 115, the lead wire 123, and the lead wire 125 to the member 81, thence through said members 81 and 82 to the corresponding lead wire 126, and thence through the lead wires 124 and 116, the contact bar 111, and the lead wire 110 back to the battery.

Upon the breaking of the circuit through the relay A of a unit, or upon lessening the normal current through the magnet 77 of a unit, as already hereinbefore set forth, the corresponding armature 78 is released from said magnet 77 and engages the fixed contact 79. Engagement of the members 78 and 79 with each other completes a circuit through the magnet 83, said circuit being traced from the battery 92 through the lead wire 107, the lower bar 108, the corresponding lead wire 112, and the corresponding lead wire 120 to said magnet 83, thence through the corresponding lead wire 121 to the corresponding movable contact 101, thence through the corresponding fixed contact 102, the lead wire 122, the lead wire 115, and the lead wire 123 to the member 78, thence through said members 78 and 79 to the corresponding lead wire 124, and thence through the lead wire 116, the contact bar 111, and the lead wire 110 back to the battery.

Energization of the magnet 83 of a unit, either by engagement of the members 78 and 79 or the members 81 and 82 with each other, causes the armatures 84 and 86, 87 to be attracted. The armature 84 when attracted engages the fixed contact 85, and the armatures 86, 87 when attracted engage the fixed contacts 88, 89, respectively. The members 86 and 87, while connected to move together, are insulated from each other.

When the members 84 and 85 and the members 86 and 88 of a unit are in engagement, a circuit is completed through the corresponding alarm signal lamps 90, said circuit being traced from the battery 92, through the lead wire 107, the lower bar 108, and the corresponding lead wire 112 to said signal lamps 90, thence through the corresponding lead wire 113 and said members 86 and 88 to the lead wire 114, thence through the members 85 and 84 and the corresponding lead wire 115 to the fixed contact 103, and thence through the corresponding movable contact 104, the lead wire 116, the contact bar 111, and the lead wire 110 back to the battery. Thus, whenever a magnet 83 is energized, the signals 90 of the corresponding unit are made discernible. Said magnet 83 of a unit will be energized either when a line wire of said unit becomes broken, or when a line wire of said unit becomes grounded.

The magnet 83 of each unit will, naturally, when once energized, remain energized as long as the contacts 101, 102 and 103, 104, respectively, remain in engagement, a holding circuit for each magnet 83 being traced from the battery 92 through the lead wire 107, the lower bar 108, the lead wire 112 and the lead wire 120 to said magnet 83, thence through the lead wire 121 to the members 101 and 102 of the unit, thence through the lead wire 122 and the members 103 and 104 of the unit to the lead wire 116, and thence through said lead wire 116, the contact bar 111, and the lead wire 110 back to the battery.

The contacts 101, 102, 103, 104, 105 and 106 together constitute a unit wherein the contacts 101 and 102 are normally in engagement, the contacts 103 and 104 are normally in engagement, and the contacts 105 and 106 are normally out of engagement with the contact 104. The contacts 102 and 103 are connected with each other by a lead wire 122. The unit including said contacts is adapted to be manipulated from normal position to position causing the contacts 101 and 102 to be disengaged, the contacts 103 and 104 to be disengaged, and the contact 104 to be engaged with both of the contacts 105 and 106.

Upon the separation of the contacts 101, 102 and 103, 104 of a unit, the holding circuit through the magnet 83 is broken. If at this time the normal circuits through relays A and B of said unit are restored to cause the corresponding members 78, 79 and 81, 82 to be separated, the circuit through said magnet 83 will be broken, and the armatures 84, 86 and 87 will move from their positions of being attracted by said magnet 83 to their non-attracted positions.

Upon the separating of the contacts 101, 102 and 103, 104, the circuits through the signals 90 will obviously become broken.

Upon the engagement of the contacts 104 and 106 of a unit with each other, a circuit will be completed through the trouble and restorer signal 91 of said unit, said circuit being traced from the battery 92 through the lead wire 107, the lower bar 108 and the lead wire 127 to said trouble and restorer signal, thence through the lead wire 128 and said contacts 106 and 104 to the lead wire 116, and thence through said lead wire 116, the bar 111, and the lead wire 110 back to the battery. Thus, the trouble and restorer signal 91 of a unit will be made discernible, and will remain discernible, as long as the contacts 104 and 106 are in engagement.

It will be apparent that upon restoration of the contacts 101, 102, 103, 104, 105 and 106 to their normal positions, as shown in Figs. 6 and 7, the corresponding trouble and restorer signal will be made non-discernible, and the corresponding alarm signals 90 will remain non-discernible provided the corresponding relays A, B and C are normally positioned. But, should there be a line wire of the unit either broken or grounded, the alarm signals 90 of the unit will become again discernible. As hereinbefore stated, when there is a condition other than normal of a unit, either the signals 90 or the signal 91 of the unit will remain discernible, depending upon the positions of the contacts 101, 102, 103, 104 and 106. It might be here remarked that the switches 93 may be of approximately the same construction as the switches 43. It will be evident that the location to be protected can include any preferred number of switches 93, all connected in series, as shown in Figs. 6 and 7.

In addition to the parts already described, the multiple alarm system includes a single gong 133 adapted to be actuated each time any one of the lamps 91 is lighted. Also, the multiple alarm system includes a supervisor's lamp 134 and a supervisor's gong 135 which are actuated whenever the gong 133 is actuated. Also, the multiple alarm system includes a supervisor's general alarm lamp 136 and general alarm gong 137 which are actuated whenever the lamps 90 of any one of the individual units of the multiple alarm system are lighted. Also, the multiple alarm system includes a single master alarm lamp 138 and a single master alarm gong 139 which are actuated whenever the lamps 90 of any one of the individual units are lighted. Also, the multiple alarm system includes a plurality of pilot lamps, designated 140, desirably incorporating a single pilot lamp for, say, the lamps 90 of five units, more or less, the purpose of the pilot lamps being a safety measure, so that if both lamps 90 of a unit should be burnt out, the lighted pilot lamp narrows the discovery of the trouble down to a group of lamps.

The multiple alarm system includes relays D and E for controlling the signals 133, 134 and 135, and relays F, G, H and I for controlling the signals 136, 137, 138, 139 and 140.

The relay D consists of a magnet 141 having a pivoted armature 142 comprising a movable switch arm of a switch including a fixed contact 143. The relay E consists of a magnet 144 having a pivoted armature 145 at one of its ends comprising a movable switch arm of a switch including a fixed contact 146, and having a pivoted armature 147 at its other end comprising a movable switch arm of a switch including a fixed contact 148.

A lead wire 149 extends from the lower bar 108 to the magnet 141, and a lead wire 150 extends from said magnet 141 to a common point 151 and here joins lead wires 152, one leading to each fixed contact 105.

A lead wire 153 connects the lead wire 149 with the contact 143, a lead wire 154 extends from the movable switch arm 142 to the magnet 144, and a lead wire 155 extends from said magnet 144 to the bar 111.

A lead wire 156 extends from the lead wire 149 to the contacts 146 and 148, a lead wire 157 extends from the movable switch arm 147 to the signal 133, and a lead wire 158 extends from said signal 133 to the bar 111. A lead wire 159 extends from the movable switch arm 145 to the signals 134 and 135, and a lead wire 160 extends from said signals 134 and 135 to said bar 111. A lead wire 161 extends from the lead wire 131 to the lead wire 159.

It will be evident that when the contacts 104 and 105 of any unit are in engagement, a circuit will be completed through the magnet 141 of the relay D, said circuit being traced from the battery 92 through the lead wire 107 to the lower bar 108, thence through the lead wire 149 to said magnet 141, thence through the lead wire 150 to the appropriate lead wire 152, thence through the contacts 105 and 104 which are in engagement, and thence through the corresponding lead wire 116, the bar 111 and the lead wire 110 back to the battery.

Energization of the magnet 141 attracts the armature 142 and causes the members 142 and 143 to engage each other.

When said members 142 and 143 are in engagement, a circuit is completed through the magnet 144, said circuit being traced from the battery 92 through the lead wire 107 to the lower bar 108, thence through the lead wire 149 and the lead wire 153 to the fixed contact 143, thence through the members 143 and 142 and the lead wire 154 to said magnet 144, thence through said magnet, and thence through the lead wire 155, the bar 111 and the lead wire 110 back to the battery.

Energization of the magnet 144 attracts both of the armatures 145 and 147 to cause the members 145 and 146 and the members 147 and 148, respectively, to engage each other.

When the members 147 and 148 are in engagement, a circuit is completed through the signal 133, said circuit being traced from the battery 92 through the lead wire 107 to the lower bar 108, thence through the lead wire 149 and the lead wire 156 to the fixed contact 148, thence through said members 148 and 147 to the lead wire 157, thence through said signal 133, and thence through the lead wire 158, the bar 111 and the lead wire 110 back to the battery.

When the members 145 and 146 are in engagement, a circuit is completed through the signals 134 and 135, said circuit being traced from the battery 92 through the lead wire 107 to the lower bar 108, thence through the lead wire 149 and the lead wire 156 to the fixed contact 146, thence through said members 146 and 145 to the lead wire 159, thence through said signals 134 and 135, and thence through the lead wire 160, the bar 111, and the lead wire 110 back to the battery.

It will be evident that the magnet 141 will be energized whenever the contacts 104 and 105 are in engagement, and that energization of said magnet 141 will, in turn, energize the magnet 144 to attract the armatures 145 and 147 to thus cause the signals 133, 134 and 135 to be actuated whenever the contacts 104 and 105 are brought into engagement. Obviously, the breaking of engagement between said contacts 104 and 105 will de-energize the magnet 141, to thus cause the magnet 144 to be de-energized and said signals 133, 134 and 135 to cease their operations. Said signals 133, 134 and 135 will, however, remain operative as long as the contacts 104 and 105 are in engagement. That is to say, the signals 133, 134 and 135 will be operated in the system in precisely the same manner as any one of the signals 91 is operated.

It will be evident that the signals 134 and 135 will be actuated whenever the fuse alarm signals 129 and 130 are actuated, a circuit through said signals 134 and 135 being completed when any fuse 109 breaks, said circuit being traced from the battery 92 through the lead wire 107 to the broken fuse, thence through the lead wire 131 to the lead wire 161, thence through the lead wires 161 and 159 to said signals 134 and 135, and thence through the lead wire 160, the bar 111 and the lead wire 110 back to the battery.

The signals 136, 137, 138, 139 and 140 are each operated whenever the alarm designating signals 90 of a unit are operated, and all of said signals 136, 137, 138, 139 and 140 are made inoperative when all of the signals 90 are made inoperative.

The relay F consists of a magnet 162 having a pivoted armature 163 at one of its ends which constitutes a movable switch arm of a switch including a fixed contact 164, and having at its other end a pivoted armature 165 which constitutes a movable switch arm of a switch including a fixed contact 166.

The relay G consists of a magnet 167 having a pivoted armature 168 at one of its ends which constitutes a movable switch arm of a switch including a fixed contact 169, and having at its other end a pivoted armature 170 which constitutes a movable switch arm of a switch including a fixed contact 171.

The relay H consists of a magnet 172 having a pivoted armature 173 at one of its ends which constitutes a movable switch arm of a switch including a fixed contact 174, and having at its other end a compound pivoted armature including bars 175 and 176 which constitute movable switch arms of switches including fixed contacts 177 and 178.

The relay I consists of a magnet 179 having a pivoted armature 180 at one of its ends which constitutes a movable switch arm of a switch including a fixed contact 181, and having at its other end a pivoted armature 182 which constitutes a movable switch arm of a switch including a fixed contact 183.

A lead wire 184 extends from the lower bar 108 to the magnet 162, a lead wire 185 extends from said magnet 162 to the switch arm 176 and a lead wire 186 extends from the switch arm 178 to the bar 111. Lead wires 187 extend from the lead wire 184 to the signals 136 and 137, and a lead wire 188 extends from said signals 136 and 137 to the contact 164. A lead wire 189 extends from the lead wire 185 to the contact 165, and a lead wire 190 extends from the contact 166 to the bar 111. A lead wire 191 connects the switch arm 163 with the lead wire 185. A lead wire 192 extends from the lower bar 108 to the switch arm 173, a lead wire 193 extends from the fixed contact 174 to the magnet 167, and a lead wire 194 extends from said magnet 167 to the lead wire 186. An incoming 110 volt lead wire 195 extends to the signal lamp 138, a lead wire 196 extends from said signal lamp 138 to the fixed contacts 169 and 171, and a lead wire 197 extends between the incoming line and the switch arms 168 and 170.

A lead wire 198 extends from the lower bar 108 to the magnet 179, a lead wire 199 extends from said magnet 179 to a plurality of the switch arms 87, and lead wires 200 extend from the fixed contacts 89 to the lead wire 116. A lead wire 201 extends from the lead wire 198 to the switch arm 182, a lead wire 202 extends from the fixed contact 183 to the signal 140, and a lead wire 203 extends from said signal 140 to the bar 111.

A lead wire 204 extends from the lead wire 198 to the switch arm 180, and a lead wire 205 extends from the fixed contact 181 to the magnet 172. A lead wire 206 extends from the lead wire 192 to the signal 139, a lead wire 207 extends from said signal 139 to the fixed contact 177, and a lead wire 208 extends from the movable contact 175 to the lead wire 186.

When the magnet 83 of any one of the individual units of the alarm system is energized to attract the armature 86 to bring the members 87 and 89 into engagement, a circuit is completed through the corresponding magnet 179, said circuit being traced from the battery 92 through the lead wire 107 to the lower bar 108, thence through the lead wire 198 to said magnet 179, thence through the lead wire 199 to the switch arm 87, thence through said members 87 and 89, and thence through the lead wire 200, the lead wire 116, the bar 111 and the lead wire 110 back to the battery.

Energization of the magnet 179 causes the armatures 180 and 182 to be attracted to thus bring the members 180 and 181, and the members 182 and 183, respectively, into engagement. Engagement of the members 182 and 183 with each other completes a circuit through the signal 140, said circuit being traced from the battery 92 through the lead wire 107, the lower bar 108 and the lead wire 198 to the lead wire 201, thence through the lead wire 201 and the members 182 and 183 to said signal 140 and thence through the lead wire 203, the bar 111 and the lead wire 110 back to the battery.

Engagement of the members 180 and 181 with each other completes a circuit through the magnet 172, said circuit being traced from the battery 92 through the lead wire 107, the lower bar 108 and the lead wire 198 to the lead wire 204, thence through the lead wire 204, the members 180 and 181 and the lead wire 205 to said magnet 172, and thence through the lead wire 186, the bar 111 and the lead wire 110 back to the battery.

Energization of the magnet 172 causes the contacts 173, 175 and 176 to be attracted to thus bring the members 173, 174 and 175, 177 and 176, 178, respectively, into engagement.

Engagement of the members 173 and 174 with each other completes a circuit through the magnet 167, said circuit being traced from the battery 92 through the lead wire 107, the lower bar 108 and the lead wire 192 to the switch arm 173, thence through said members 173 and 174 and the lead wire 193 to the magnet 167, and thence through the lead wire 194, the lead wire 186, the bar 111 and the bar 110 back to the battery. Energization of the magnet 167 attracts the armatures 168 and 170 to cause the members 168, 169 and 170, 171, respectively, to be engaged with each other. Engagement of the members 168, 169 and 170, 171 completes the 110 volt circuit through the signal 138, as will be apparent. The circuit of the 110 volt line will flow through both the switch arm 168 and the switch arm 170.

Engagement of the members 175 and 177 with each other completes a circuit through the signal 139, said circuit being traced from the battery 92 through the lead wire 107, the lower bar 108 and the lead wire 192 to the lead wire 206, thence through said signal 139, thence through the lead wire 207, thence through said members 177 and 175, and thence through the lead wire 208, the lead wire 186, the bar 111 and the lead wire 110 back to the battery.

Engagement of the members 176 and 178 with each other completes a circuit through the magnet 162, said circuit being traced from the magnet 92 through the lead wire 107, the lower bar 108 and the lead wire 184 to said magnet 162, thence through the lead wire 185 to the switch arm 176, thence through said members 176 and 178 to the lead wire 186, and thence through said lead wire 186, the bar 111 and the lead wire 110 back to the battery.

Energization of the magnet 162 will cause the armatures 163 and 165 to be attracted to bring the members 163, 164 and 165, 166, respectively, into engagement. When the members 163 and 164 are in engagement, a circuit will be completed through the signals 136 and 137, said circuit being traced from the battery 92 through the lead wire 107 and the lower bar 108 to the lead wire 184, thence through the lead wire 184 and the lead wire 187 to said signals 136 and 137, thence through the lead wire 188 to the fixed contact 164, thence through said members 164 and 163 to the lead wire 191, thence through the lead wire 185 to the switch arm 178, thence through said members 178 and 176 to the lead wire 186, and thence through the bar 111 and the lead wire 110 back to the battery.

When the members 165 and 166 are in engagement a holding circuit for the magnet 162 is completed, said holding circuit being traced from the battery 92 through the lead wire 107, the lower bar 108 and the lead wire 184 to said magnet 162, thence through the lead wires 185 and 189 to said members 165 and 166, and thence through the lead wire 190, the bar 111 and the lead wire 110 back to the battery.

It will be apparent that the magnet 179 will be energized when and only when the lamps 90 of a unit are lighted. Upon the breaking of the circuit through said lamps 90, the circuit will also be broken through the magnet 179. This will, obviously, break the circuit through the signal 140 as well as through the magnet 172. Upon the breaking of the circuit through the magnet 172 the circuit will, in turn, be broken through the signal 139, through the magnet 167, and through the signal 138. Thus, when all of the lamps 90 are extinguished, all of the signals 138, 139 and 140 will be inactive. But the signals 136 and 137 having been once made operative will remain operative because of the holding circuit for the magnet 162, as will be evident. This holding circuit is adapted to be broken by manual operation of a hand switch 209 inserted in the lead wire 190. Thus, it will be seen, the supervisor's general alarm lamp 136 and general alarm gong 137 will remain active after the signals 90, 138, 139 and 140 are inactive, and until the supervisor has manipulated the hand switch 209 to break the holding circuit, after the supervisor has given proper attention to the general alarm. That is to say, the signals 90, 138, 139 and 140 are rendered inactive by manipulation of the corresponding switch including the members 101 to 106, inclusive, while the signals 136 and 137 are rendered inactive by manipulation of the hand switch 209.

The lamp 138 will in practice be of relatively great strength, and for this reason the 110 volt power line is as disclosed connected up to keep this lamp lighted. A substituted arrangement could, of course, be incorporated.

Attention is called to the fact that the supervisor's signals 136 and 137 could be a series of supervisors' signals which could be situated at any of a number of different locations.

The present multiple alarm system may be employed in connection with a broadcasting system when this may be desirable, by cutting in the broadcasting system when an alarm is received in the multiple alarm system.

Referring more particularly to Figs. 6 and 7 of the drawings, J represents a relay of the multiple alarm system adapted to actuate a relay K of a broadcasting system, the main features of which broadcasting system are not shown.

The relay J consists of a magnet 210 having a pivoted armature 211 at one of its ends which constitutes a movable switch arm of a switch including a fixed contact 212, and having at its other end a pivoted armature 213 which constitutes a movable switch arm of a switch including a fixed contact 214.

The relay K consists of a magnet 215 having a pivoted armature 216 at one of its ends which constitutes a movable switch arm of a switch including a fixed contact 217, and having at its other end a pivoted armature 218 which constitutes a movable switch arm of a switch including a fixed contact 219.

A lead wire 220 extends from the lead wire 193 to the magnet 210, and a lead wire 221 extends from said magnet 210 to the lead wire 194. That is to say, the magnet 210 is connected in parallel with the magnet 167, so that when said magnet 167 is energized, the magnet 210 is also energized.

When said magnet 210 is energized, its armatures 211 and 213 are attracted to cause the members 211, 212 and 213, 214, respectively, to be in engagement. When said members 211, 212 and 213, 214 are in engagement, a circuit through the magnet 215 is completed, said circuit including a battery 222 and being traced from said battery through a lead wire 223 to the contacts 212 and 213, thence by a lead wire 224 from the switch arms 211 and 213 to said magnet 215, and thence by a lead wire 225 to said battery 222.

Energization of the magnet 215 completes the radio broadcasting circuit, including lead wires 226 and 227, which lead wires are connected together, as will be obvious, by engagement of the members 216, 217 and 218, 219, respectively, the circuit including both of the switch arms 216 and 218.

The relay K for the radio broadcasting system is in the radio broadcasting system and it closes the circuit of the radio transmitter. The relay J for operating the relay K, by closing the circuit including the battery 222 and the magnet 215, is a part of the multiple alarm system. When the multiple alarm system is to be used without a radio transmitting system, the relay J, together with its connections, will, of course, be omitted.

It will be apparent that the radio transmitting system circuit will be closed immediately upon the reception of an alarm in the multiple alarm system, so that by the time an attendant of the multiple alarm system has noted the location originating the alarm and is ready to broadcast the alarm, the radio transmitter is on the air and ready for the broadcast. Thus, anywhere from ten seconds to a minute or more may be saved in dispatching a received alarm by radio.

In Figs. 8 to 22 there is disclosed in a general way, a structure for setting up the multiple alarm system for operation. Reference numerals which have been used in connection with the description of Figs. 6 and 7 are applied at locations where applicable upon Figs. 8 to 22.

Figure 8:
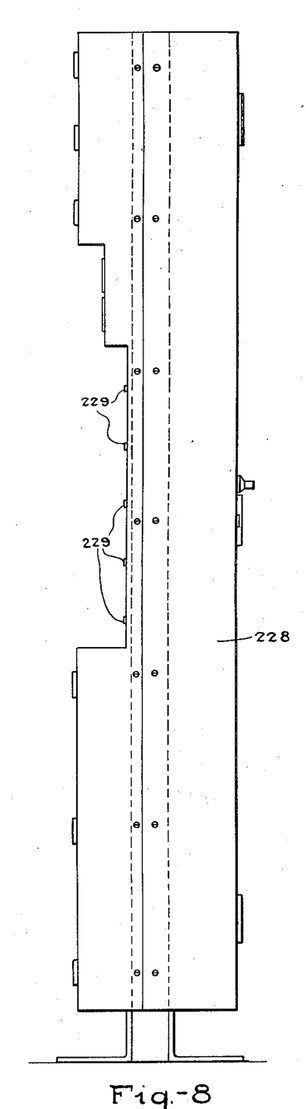
Fig. 8 is a side elevational view of a cabinet for housing a plurality of alarm producing units of a multiple alarm system made according to the invention.
Figure 9:
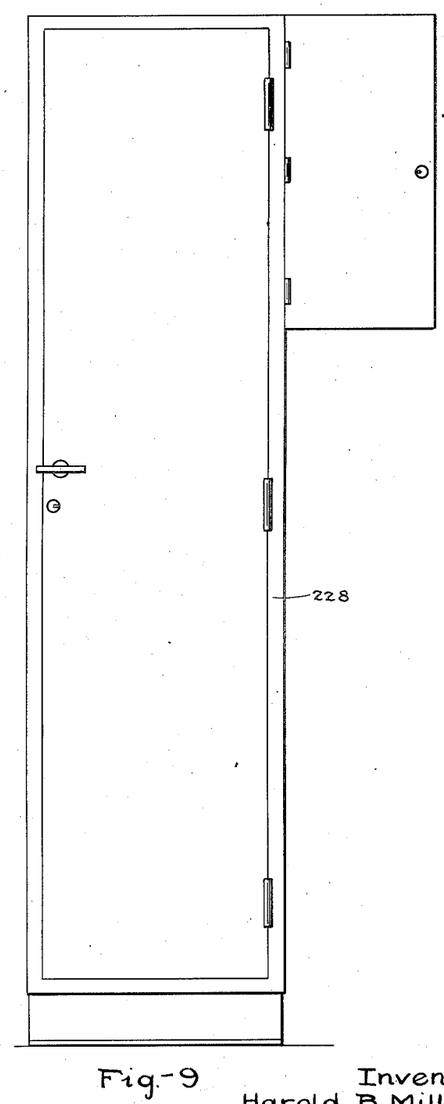
Fig. 9 is a rear elevational view of the cabinet of Fig. 8.
Figures 10, 16, 17, 21, 22:
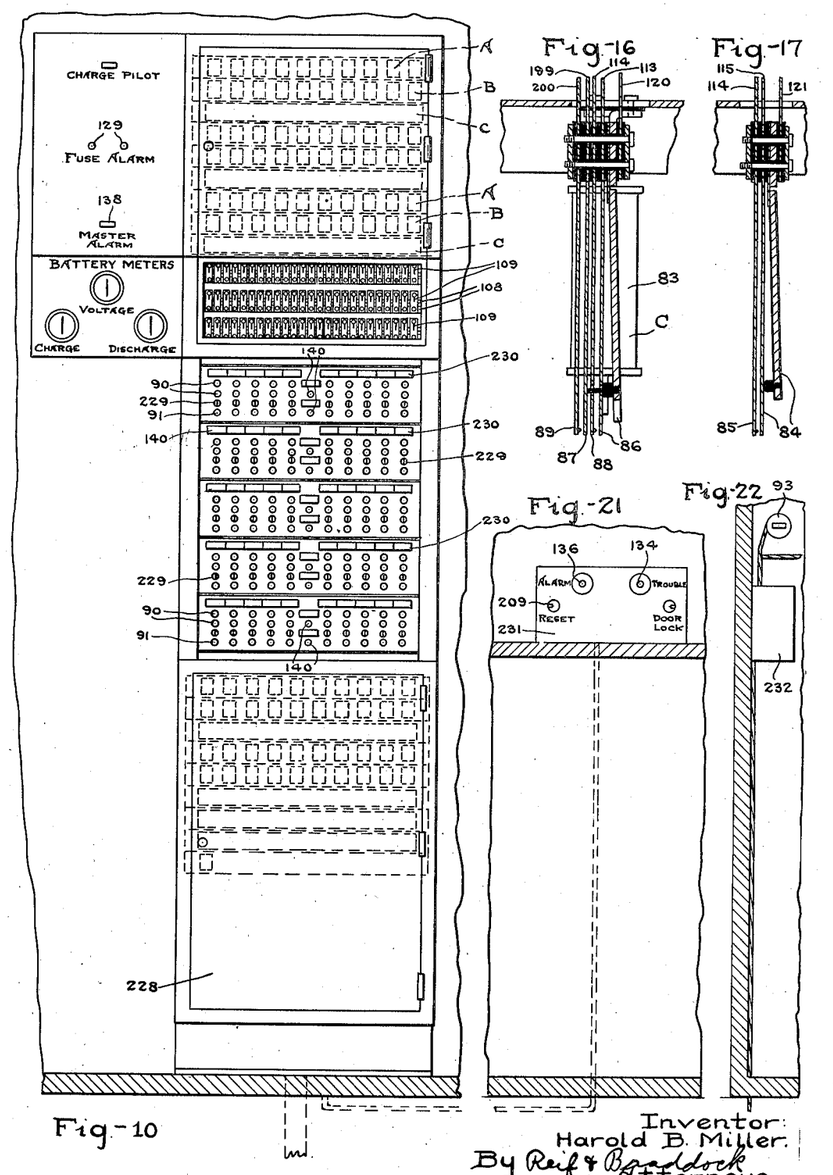
Fig. 10 is a front elevational view of said cabinet of Fig. 8.
Fig. 16 is a sectional view of the lower relay of Fig. 13, taken on line 16—16 in said Fig. 13.
Fig. 17 is a sectional view of said lower relay of Fig. 13, taken on line 17—17 in said Fig. 13.
Fig. 21 is a fragmentary sectional view of a supervisor's cabinet.
Fig. 22 is a fragmentary sectional view of a support for an alarm actuating mechanism, in spaced relation to the alarm designating mechanism, the present view disclosing said alarm actuating mechanism in elevation.

In Figs. 8, 9 and 10 there is disclosed a cabinet 228 in which the parts of the multiple alarm system are suitably housed. In Figs. 10, 11, 12, 13, 18, 19 and 20 specific features of construction of the cabinet 228 and its appurtenances are illustrated in detail.

With more specific reference to Figs. 8, 9, 10, 11, 12, 19 and 20, certain of the relays are shown housed in the upper part of the cabinet, and certain of said relays are shown housed in the lower part of the cabinet. The front wall of the cabinet provides a panel for the various signal lights 90 and 91. The fuse alarms and the master alarm are shown situated upon the upper left hand portion of the cabinet, as are also indicia denoting the battery meters, voltage, etc. Upon the panel the units consisting of the contacts 101 to 106, inclusive, are each designated 229. In Fig. 11 one of these units is shown in detail. Said units 229 can be constructed in any suitable manner, and can be conveniently mounted to be insulated from the panel after any preferred fashion.

There are upon the panel sign plates 230, one for the signals of each unit, for designating the location whence an alarm emanates.

When the lamps 90 of a unit are lighted, the lamp 140 which includes said unit will be lighted. Should the signal lamps 90 of a unit in a particular instance be burnt out, the corresponding lamp 140 will, nevertheless, be lighted and each of the keys of the switches 229 of the units parallelly connected with said lamp 140 which is lighted will be manually turned to actuate said switches until the master alarm ceases to function. The key which causes the alarm to restore will give the location of the originating alarm position, as will be evident.

In Figs. 11, 13 and 18 the fuse panel is shown in detail, and in Fig. 10 said fuse panel is shown suitably mounted upon the panel of the cabinet 228. The various fuses are of the telltale type suitably supported across the upper and lower contact bars 108, and are of any construction suiting them to their purpose.

Figure 20:
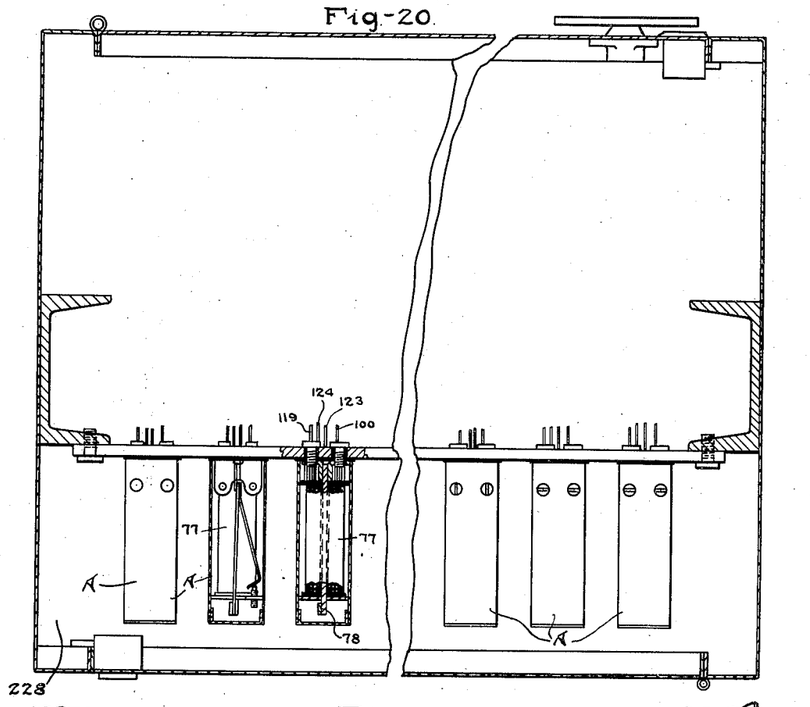
Fig. 20 is a detail sectional view taken as on line 20—20 in Fig. 19.

In Figs. 13, 14, 15, 16 and 17, as well as in Figs. 20 and 21, the relays A, B and C are shown in detail, and the manner in which said relays are mounted in the cabinet is illustrated. Suffice it to say that all of the relays which have been described may be suitably mounted in said cabinet 228.

In Fig. 21 there is disclosed a separate cabinet 231 in which the signals 134, 135, 136 and 137 are mounted. This cabinet 231 is termed the supervisor's cabinet and is designed for location in a room spaced from the cabinet 228, the purpose of the signals housed in the cabinet 231 being to inform a supervisor or other attendant of what is happening at the cabinet 228 of the multiple alarm system. The general manner in which the signals 134, 135, 136 and 137 operate has been set forth. As has been hereinbefore stated, the alarms 136 and 137 in the supervisor's cabinet will continue to operate after the alarms 90, 138, 139 and 140 have ceased to operate, and said alarms 136 and 137 can only be made inoperative by manipulation of the switch 209, as for example by the opening or releasing of an electrical lock by the supervisor in such a manner that a key for said lock cannot be removed from the lock until the lock is afterwards restored to its normal position. Thus is provided a method by which a key having a number tag thereon can be utilized by each supervisor, so that the failure to reset the alarm can be traced back to a supervisor at fault.

As hereinbefore set forth the signals 134 and 135 in the supervisor's cabinet are actuated and made inactive synchronously with a signal 91. Thus, the supervisor can check on a line in trouble and have said line cared for in due course. Said signals 134 and 135 in the supervisor's cabinet cannot be made inactive until all of the signals 91 and the signal 133 are made inactive, as will be evident.

It will be noted that all of the circuits are fused singly so that the burning out of any fuse brings in an alarm on the main panel. The fuse used being of the mechanical telltale type, it is easily located to be replaced by a new fuse.

It need not be remarked that all of the covers of the main cabinet and the supervisor's cabinet are locked closed to thus prevent tampering with any part of the mechanism by unauthorized persons.

In Fig. 22 there is disclosed any one of the alarm actuating mechanisms of Figs. 1, 2, 4, 5, 6 and 7, the switch of said alarm actuating mechanism being designated 93, and a case for the remainder of the parts of said mechanism being denoted 232. Said case 232 will, of course, be locked closed. Preferably, this case will be inaccessible, as will also the lead wire from the switch 93 to the case and to ground.

What I claim is:—

1. An alarm system comprising an alarm designating unit including a plurality of electric circuits, a signal included in an electric circuit of said alarm designating unit, said electric circuits additionally including a holding electric circuit for said signal circuit and independent of said signal, and a normally energized electric circuit, means at remote distance from said alarm designating unit grounding said normally energized circuit, said normally energized circuit including a line wire extending from said alarm designating unit and a resistance adjacent the grounding means affording a connection between said line wire and said grounding means, and a magnetically regulated electric switch in said signal circuit and controlled by said normally energized and said holding circuits.

2. An alarm system comprising an alarm designating unit including a plurality of electric circuits, a signal included in an electric circuit of said alarm designating unit, said electric circuits additionally including a holding electric circuit for said signal circuit and independent of said signal, and a normally energized electric circuit, means at remote distance from said alarm designating unit grounding said normally energized circuit, said normally energized circuit including a line wire extending from said alarm designating unit and a resistance adjacent the grounding means affording a connection between said line wire and said grounding means, magnetically actuated means in said normally energized circuit for closing said holding circuit either when a line wire of the system becomes broken or when a line wire of said system becomes grounded, and an electric switch under the control of said holding circuit for opening and closing said signal circuit.

3. An alarm system comprising an alarm designating unit including a plurality of electric circuits, a signal included in an electric circuit of said alarm designating unit, said electric circuits additionally including a holding electric circuit for said signal circuit and independent of said signal, and a normally energized electric circuit, means at remote distance from said alarm designating unit grounding said normally energized circuit, said normally energized circuit including a line wire extending from said alarm designating unit and a resistance adjacent the grounding means affording a connection between said line wire and said grounding means, magnetically actuated means in said normally energized circuit for closing said holding circuit upon cessation of current flow in said line wire, magnetically actuated means in said normally energized circuit for closing said holding circuit upon alteration of amount of current flow in said line wire, magnetically actuated means in said holding circuit for maintaining the holding circuit in closed condition when once closed, and an electric switch under the control of said holding circuit for opening and closing said signal circuit.

4. An alarm system comprising an alarm designating unit including a plurality of electric circuits, a signal included in an electric circuit of said alarm designating unit, said electric circuits additionally including a holding electric circuit for said signal circuit and independent of said signal, and a normally energized electric circuit, means at remote distance from said alarm designating unit grounding said normally energized circuit, said normally energized circuit including a line wire extending from said alarm designating unit and a resistance adjacent the grounding means affording a connection between said line wire and said grounding means, magnetically actuated means for closing said holding circuit upon cessation of and upon alteration of amount of current flow in said line wire and for maintaining the holding circuit in closed condition when once closed, and an electric switch under the control of said holding circuit for closing and opening said signal circuit.

5. An alarm system comprising an alarm designating unit including a plurality of electric circuits, an ordinary signal included in an electric circuit of said alarm designating unit, a special signal included in an electric circuit of said alarm designating unit, said electric circuits additionally including a holding electric circuit for said ordinary signal and special signal circuits, said holding electric circuit being independent of said signal, and a normally energized electric circuit, means at remote distance from said alarm designating unit grounding said normally energized circuit, said normally energized circuit including a line wire extending from said alarm designating unit and a resistance adjacent the grounding means affording a connection between said line wire and said grounding means, a magnetically regulated electric switch in said ordinary signal circuit, and a magnetically regulated electric switch in said special signal circuit, said electric switches being controlled by said normally energized and said holding circuits.

6. An alarm system comprising an alarm designating unit including a plurality of electric circuits, an ordinary signal included in an electric circuit of said alarm designating unit, a special signal included in an electric circuit of said alarm designating unit, said electric circuits additionally including a holding electric circuit for said ordinary signal and special signal circuits, said holding electric circuit being independent of said signal, and a normally energized electric circuit, means at remote distance from said alarm designating unit grounding said normally energized circuit, said normally energized circuit including a line wire extending from said alarm designating unit and a resistance adjacent the grounding means affording a connection between said line wire and said grounding means, magnetically actuated means for closing said holding electric circuit upon cessation of and upon alteration of amount of current flow in said line wire and for maintaining the holding circuit in closed condition when once closed, an electric switch under the control of said holding circuit for opening and closing said ordinary signal circuit, and an electric switch under the control of said holding circuit for opening and closing said special signal circuit.

7. An alarm system comprising an alarm designating unit including a signal circuit, a signal in said circuit, a holding electric circuit for said signal circuit, said holding electric circuit being independent of said signal, and a normally energized electric circuit, means at remote distance from said alarm designating unit grounding said normally energized circuit, said normally energized circuit including a line wire extending from said alarm designating unit and a resistance adjacent the grounding means affording a connection between said line wire and said grounding means, means for closing said holding circuit upon cessation of and upon alteration of amount of current flow in said line wire and for maintaining the holding circuit in closed condition when once closed, an electric switch under the control of said holding circuit for opening and closing said signal circuit, and means for manually opening said holding circuit.

HAROLD B. MILLER.